United States Patent [19]

Hill et al.

[11] Patent Number: 4,514,613
[45] Date of Patent: Apr. 30, 1985

[54] METHOD OF AN APPARATUS FOR WELDING TOGETHER METAL COMPONENTS

[75] Inventors: Michael Hill; John H. P. C. Megaw, both of Oxford, England; Howard Harvey, Caerleon, Wales

[73] Assignee: Lucas Industries PLC, Great King St., Birmingham, England

[21] Appl. No.: 377,157

[22] Filed: May 11, 1982

[30] Foreign Application Priority Data

May 21, 1981 [GB] United Kingdom ............... 8115638

[51] Int. Cl.³ .............................................. B23K 27/00
[52] U.S. Cl. ...................... 219/121 EC; 219/121 ED; 219/121 LC; 219/121 LD; 219/121 PJ; 219/121 PK; 219/159; 219/161
[58] Field of Search ............... 219/107, 102, 159, 161, 219/121 LC, 121 LD, 121 EC, 121 ED, 121 PJ, 121 PK

[56] References Cited

U.S. PATENT DOCUMENTS

· 3,949,186  4/1976  Nakayama et al. .......... 219/121 ED
  4,291,219  9/1981  Trent et al. ............... 219/121 EC X
  4,332,998  6/1982  Boros ........................... 219/107

FOREIGN PATENT DOCUMENTS 1462120  1/1977  United Kingdom .
1562922  3/1980  United Kingdom .

Primary Examiner—C. L. Albritton
Attorney, Agent, or Firm—Holman & Stern

[57] ABSTRACT

In having a method of welding together metal components (A,B) a high restraint geometry (as defined in the Specification) the components are urged into abutment and a high energy density weld is effected at a location in said abutment by means such as a focussed laser beam (L). In order to compensate for the high restraint geometry of the components which prevents them from deformation such as to accommodate welding stresses, an additional force (J) is applied, for example by a roller (K), to urge the components together adjacent to the position at which the weld is effected. The method is advantageously employed to form a continuous elongate weld between a plateform and web of a brake shoe.

33 Claims, 5 Drawing Figures

METHOD OF AN APPARATUS FOR WELDING TOGETHER METAL COMPONENTS

BACKGROUND OF THE INVENTION

1. Field of the Invention

This invention relates to a method of and apparatus for welding together metal components and is particularly, but not exclusively, applicable to the manufacture of vehicle drum brake shoes, each having an arcuate platform of which the convex surface ultimately supports a lining of friction material and the concave surface has at least one web extending perpendicularly thereto.

2. Description of the Prior Art

It is well known to weld components together using for example electrical or laser welding methods. One of the most common types of electrical welding is resistance/projection welding. This entails passing the components to be welded between top and bottom electrodes and producing either a continuous weld or a plurality of spot welds to connect the components together. Such a method, as exemplified in British Patent Specification No. 1462120, has hitherto been applied to the manufacture of drum brake shoes, the platform being connected to the web by a series of longitudinally spaced spot welds.

A considerable amount of heat is generated in the components during the welding operation and the components thereby become distorted. This is particularly disadvantageous in the manufacture of brake shoes because the distortion in the platform necessitates the coining or planishing of the latter to provide the correct degree of curvature to accept the usual lining of friction material. Moreover, it is important for at least the tips of the web to be dimensioned accurately and, because of heat distortion, the webs are usually blanked with a surplus of material at the tips and the webs require machining, after welding, to produce the correct dimensions. Further disadvantages become apparent in fluctuating weld quality due to irregular current flow which results from electrode wear, and in that the jig or other apparatus used for supporting the components during welding has to be electrically conductive to enable the welding currents to be applied. All of these factors lead to a relatively expensive product.

The use of laser radiation in welding together metal components is also known. An example of such a method is disclosed in U.K. Pat. No. 1562922 which relates to a method of welding together two flat flexible strips of metal. The two strips are brought together by a system of rollers to form a converging Vee between the strips such that facing reflective surfaces are provided. A focused laser beam is directed at the junction between the two strips so that laser radiation is reflected into the junction between the two strips and the weld established. The flexible nature of the two strips of metal and the symmetry of the arrangement means that little or no mechanical stresses are set up in the welded joint, and such stresses as are set up are relieved by the flexible nature of the metal strips.

Certain types of components are of "high restraint geometry" which, for the purpose of the Specification is defined as meaning a geometry such that the components cannot deform during welding to accommodate stresses set up in the components as a result of the welding process.

SUMMARY OF THE INVENTION

Problems of weld quality arise when conventional welding methods are applied to components of high restraint geometry and an object of the present invention is to provide a method of and apparatus for welding together metal components of high restraint geometry, and particularly elongate metal components such as the arcuate platforms and webs of drum brake shoes, in which the aforesaid problems encountered in conventional methods are minimized or avoided.

According to the present invention, a method of welding together metal components of high restraint geometry as hereinbefore defined comprises urging the components into firm abutting relationship, effecting a high energy density weld between the components at a location of mutual abutment thereof, and applying an additional force to the components such as to urge them together, at least adjacent to said location in order to compensate for stresses set up therein during welding.

In many cases, it is required to produce a continuous elongate weld and this may conveniently be achieved by effecting relative movement between the components supported in abutting relationship, and the position at which the weld is effected. During such a continuous welding operation, it is necessary to maintain the additional force urging the components together during said relative movement and it can be convenient to apply a localized force and to vary the location of its action progressively along the components as a function of said relative movement between the position at which welding is effected and the abutting components. It may be convenient, in a continuous welding operation, to apply the additional force continuously at a location slightly behind said position relative to the progress of the weld formation along the components.

During the formation of an autogenous weld, i.e. one in which no material is added to the weld, shrinkage of the components is likely to take place at the location of the weld. Particularly when arcuate components are welded together autogenously, their high restraint geometry prevents them from compensating for the material shrinkage, and cracking of the weld would normally be expected to occur with such components. However, the method of the present invention can successfully be used to weld together components of high restraint geometry such as the platforms and webs of brake shoes, because the additional force applied to the components to urge them together in the vicinity of the weld compensates for material shrinkage and thereby minimizes or prevents cracking of the weld.

In the particular application of the method of the invention to the formation of a butt-weld between the platforms and webs of brake shoes, the components are supported in mutually perpendicular planes, with the convex edge of the web in abutment with the concave surface of the platform, the weld is effected at the junction between abutting surfaces of the components, relative rotation is performed between the components and the position at which the weld is effected to produce a continuous weld, and the additional force is applied to the components continuously to urge them together at a location adjacent to said position relative to the progress of the weld formation along the components. By careful choice of the location of application of said force relative to the position of weld formation, it is found that a convex or "beaded weld" of excellent integrity is formed, which is free from cracking or substantially so.

The components are preferably urged into abutting relationship by clamping them together in their initial supported positions, such clamping being effected by applying a clamping force to one component and reacting it via the other component against a relatively fixed surface. In this form of the method, the additional force urging the components together adjacent to said position is applied to said other component in a direction opposed to the clamping force.

Preferably, the weld is effected by the application of a high energy density beam which, in the case of a continuous welding operation, is conveniently directed generally transversely to the direction of said relative movement between the components and said position. The beam may conveniently by of laser, electron or plasma energy.

From another aspect of the invention, apparatus for welding together metal components of high restraint geometry as hereinbefore defined, comprises means arranged to support the components and urge them firmly into abutting relationship, a welding device arranged and operable to effect a high energy density weld between the components at a location of mutual abutment thereof, and means operable to apply an additional force to the components to urge them together, at least adjacent to said location in order to compensate for stresses set up therein during welding.

The welding device is preferably of the laser or electron beam type but may alternatively be a plasma arc or plasma jet device.

When it is desired to form an elongate continuous weld or a succession of welds along a length of the components, the support means and welding device may be arranged for relative movement. In order to maintain said additional force urging the components together, the force-applying means may conveniently be in the form of a rolling member which engages a surface of one of the components and rolls over that surface during said relative movement. The required force may conveniently be applied to the rolling member by power means, preferably in the form of a pressure fluid-operated device, conveniently operable against the action of spring means urging the rolling member from said surface.

Preferably, clamp means is provided to clamp the components in their supported positions, such means conveniently including a movable clamping member operable to apply a force to one component which is reacted against a relatively fixed surface. With this arrangement, the force applying means may be arranged to act in a direction opposed to the clamping force.

In one practical arrangement of the apparatus for use with arcuate brake shoe components, the support means is a hollow drum and the components are urged by said clamping member against the internal surface of the drum, the force-applying roller projecting through a peripheral groove of the drum into contact with one of the components.

BRIEF DESCRIPTION OF THE DRAWINGS

The invention will now be described, by way of example, with reference to the accompanying drawings in which.

DETAILED DESCRIPTION OF THE INVENTION

Figure 1:
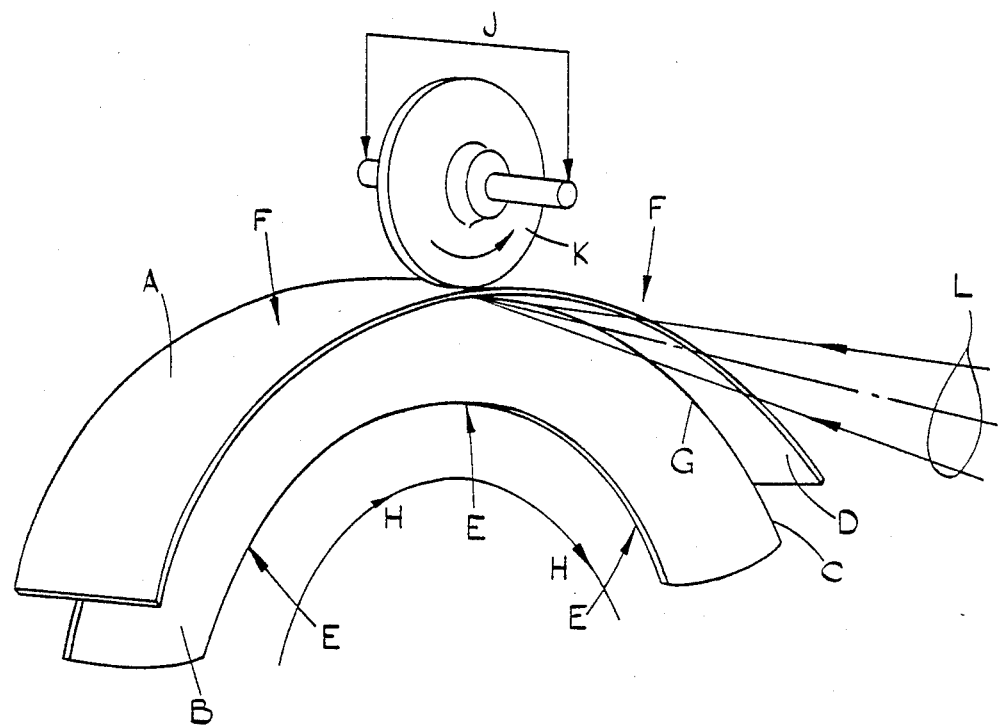
FIG. 1 is a diagrammatic representation of an arrangement for carrying out the method of the invention.

Referring to the drawings, FIG. 1 illustrates, in a simplified manner, the way in which the invention is performed, as applied to welding together the arcuate platform A and web B of a brake shoe. The web is placed with its convex edge C engaged against the concave face D of the platform and opposed forces E and F are applied respectively to the platform and web to hold them in engagement. A focused laser beam L is applied to the junction G between the platform and web to effect a weld therebetween and relative movement is effected between the engaged components and the beam L, as represented by the arrows H, in order to produce a continuous weld.

Because the components being welded are of high restraint geometry, they cannot deform to accommodate stresses, arising for example, from shrinkage of the metal during welding. In order to compensate for this, an additional force J is applied to the components to urge them together, by means of a roller K adjacent to the location of impingement of the beam. The method of the invention, and an apparatus for carrying out the method will be described hereafter in more detail.

Figure 2:
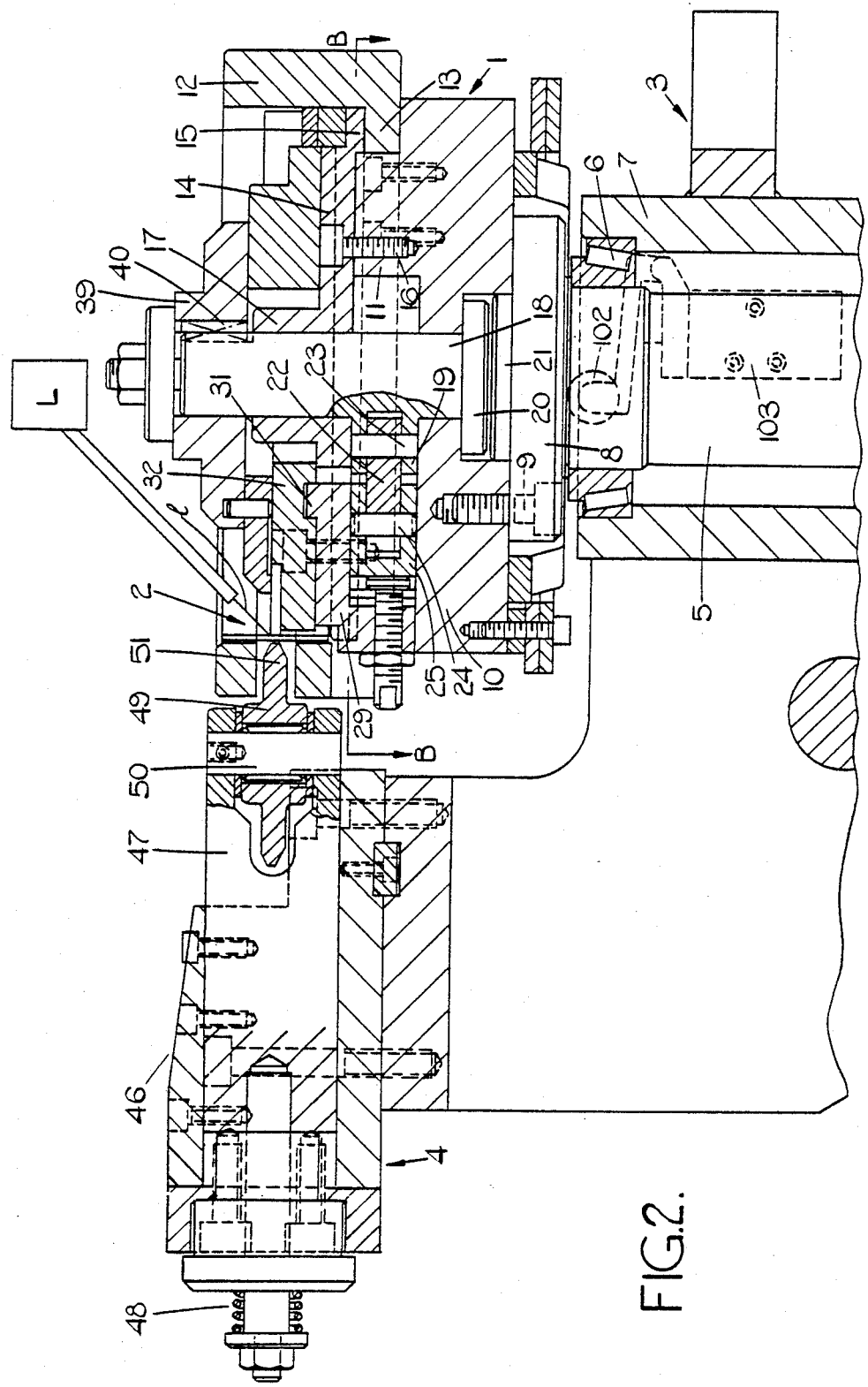
FIG. 2 is an axial cross-section of one form of welding apparatus for carrying out the method of the invention.

FIG. 2 of the drawings shows one form of apparatus for use in carrying out the method of the invention as applied to the welding together of arcuate platform and web components to produce drum brake shoes of conventional form. The apparatus comprises, in brief, a drum assembly 1 for supporting, in this case, two sets of brake shoe components 2 to be welded, a support 3 upon which the drum assembly 1 is rotatably mounted and a force applying mechanism 4. A focusing laser device is diagrammatically indicated at L.

The drum assembly 1 is supported for rotation on a drive shaft 5 rotatably mounted in bearings, one of which is shown and designated 6, housed within a fixed cylindrical portion 7 of the support 3. The upper end of the shaft 5 is provided with a flange 8 enabling it to be secured by way of bolts 9 to an anchor plate 10 of the drum assembly for the purpose of driving that assembly in rotation. The anchor plate 10 is formed with a part-annular spigot 11, and a drum 12 of the drum assembly has a radially inwardly directed flange 13 defining a central opening such as closely to surround the spigot 11. A retaining plate 14 is recessed on its underside to receive the spigot 11 of the anchor plate 9 closely therein and is also provided with a peripheral flange 15 which overlies the inward flange 13 of the drum 12 so that the drum inward flange 13 is tapped between the retaining plate peripheral flange 15 and the anchor plate 10. The retaining plate is rigidly secured in position by bolts 16 screwed into threaded apertures formed in the spigot 11.

The retaining plate 14 has a central boss 17 which serves as a bearing for an operating shaft 18. The shaft 18 has a pair of diametrically opposed laterally shaft projecting flanges 19 which overlie an adjacent upper surface portion of the anchor plate 10 and a retaining member 20 housed within a recess 21 of the retaining plate is secured to the end of the operating shaft 18 by screws or the like and engages an under-surface of the anchor plate 10 within the recess 21 to limit axial movement of the shaft 18.

As will be seen more clearly from FIGS. 2 to 5, each of the shaft flanges 19 is bifurcated to embrace respective toggle links 22 which are pivotally connected to the flanges 19 by pins 23. The links are in turn connected respectively by further pins 24 to connecting members 25, each of which is provided with a T-slot 26 which receives the head 27 of a connecting screw 28. The connecting members 25 are housed respectively within a pair of slides 29, each being connected to its slide by way of the corresponding screw 28 which is threadedly engaged with the adjacent slide and permits the relative positions of the slide and associated connecting member to be adjusted by rotation of the screws 28 which may be locked in desired positions by lock nuts 30. The two slides and their associated mechanisms are identical and only one of them will be described in detail hereafter.

As will be seen more clearly from FIG. 2, the upper surface of the slide 29 is provided with an upstanding key 31 housed within a corresponding recess in the under-side of a first clamp member 32 shaped to extend over just less than one half of the drum periphery. The clamp member 32 is stepped to provide an abutment surface 33 for the edge of the web 34 of a brake shoe to be welded, the platform 35 of the brake shoe resting against an internal surface 36 of the drum 12.

Figure 3:
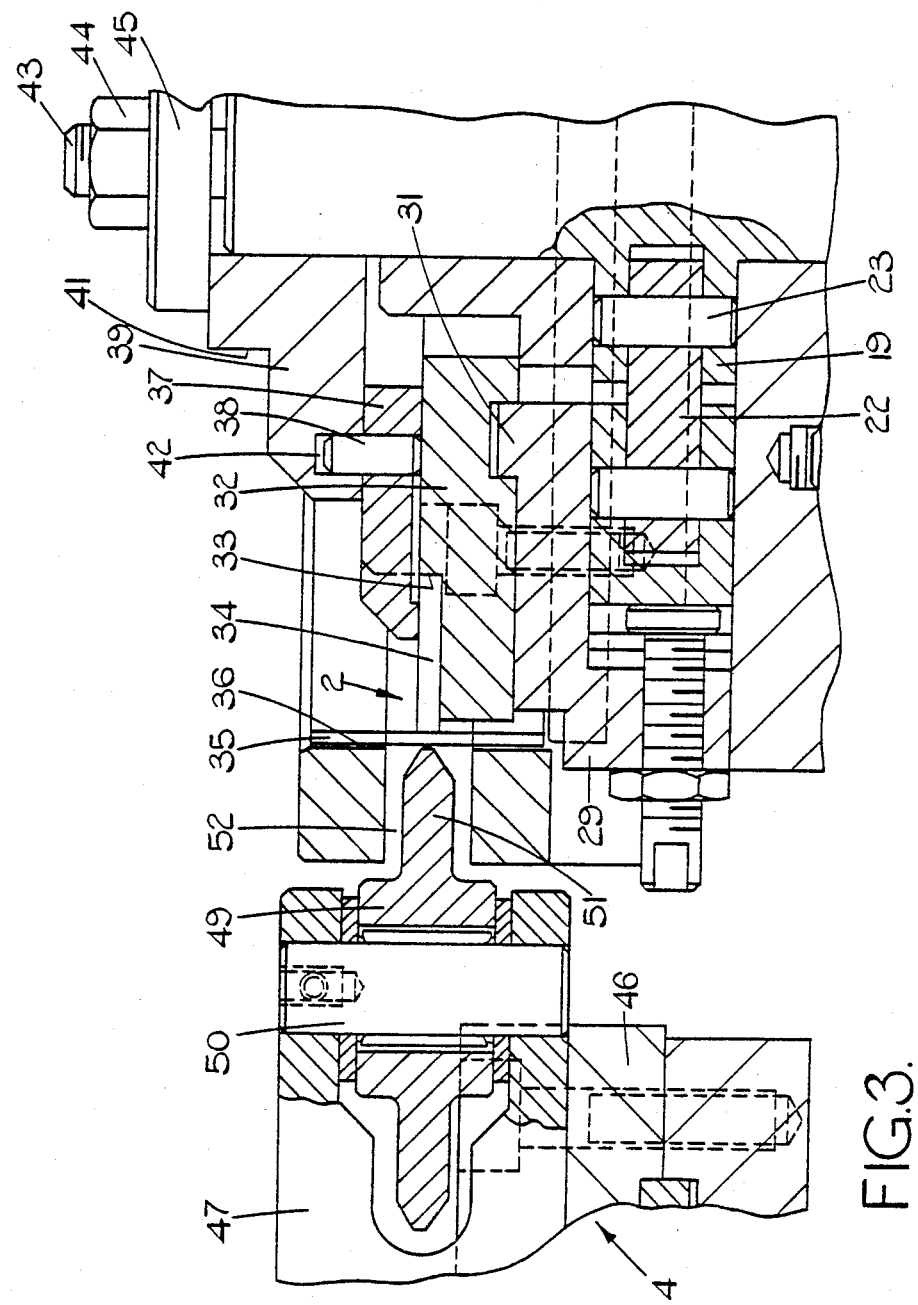
FIG. 3 is an enlarged detail of part of the apparatus of FIG. 2.
Figure 4:
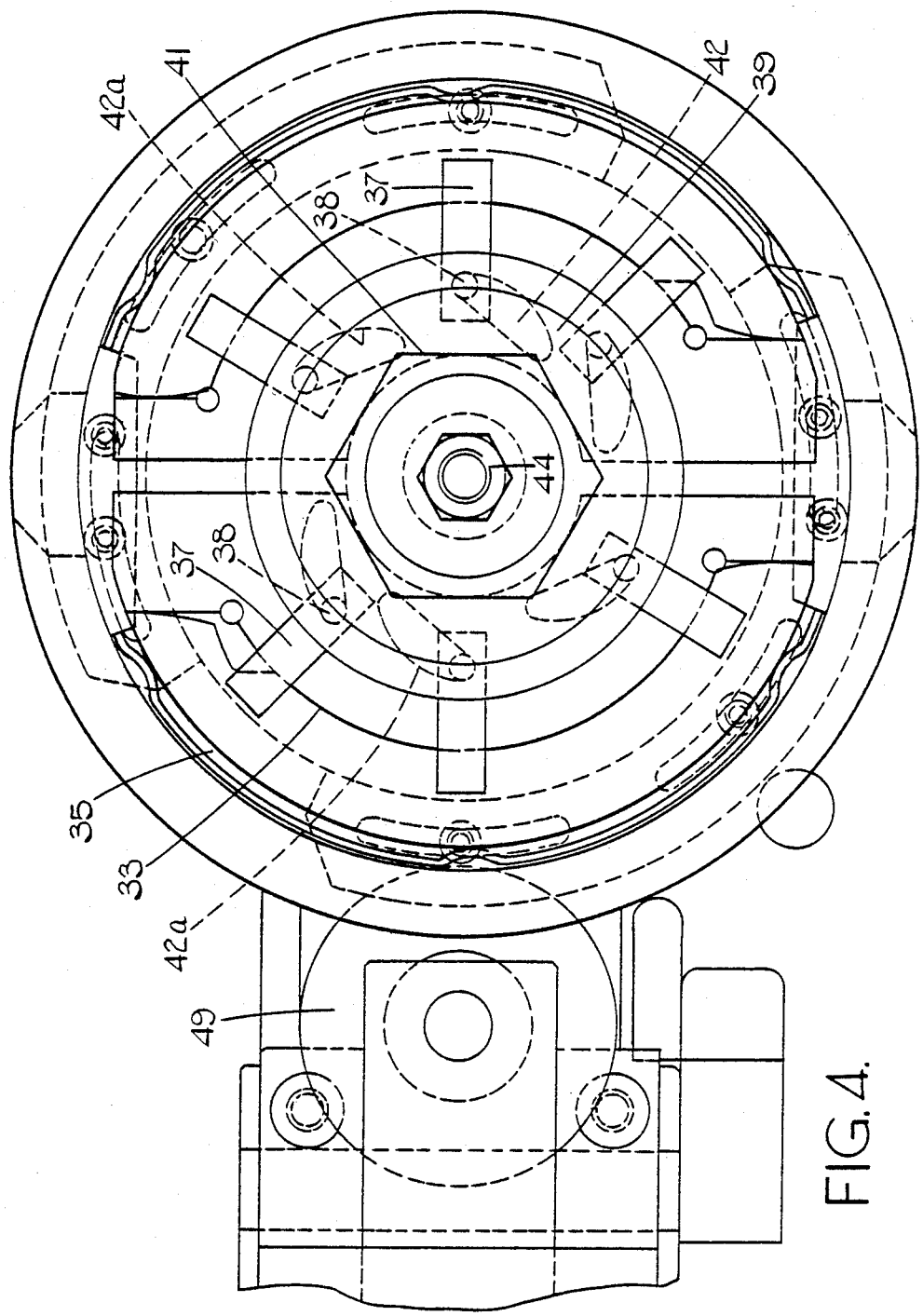
FIG. 4 is a plan view of the apparatus of FIGS. 2 and 3.
Figure 5:
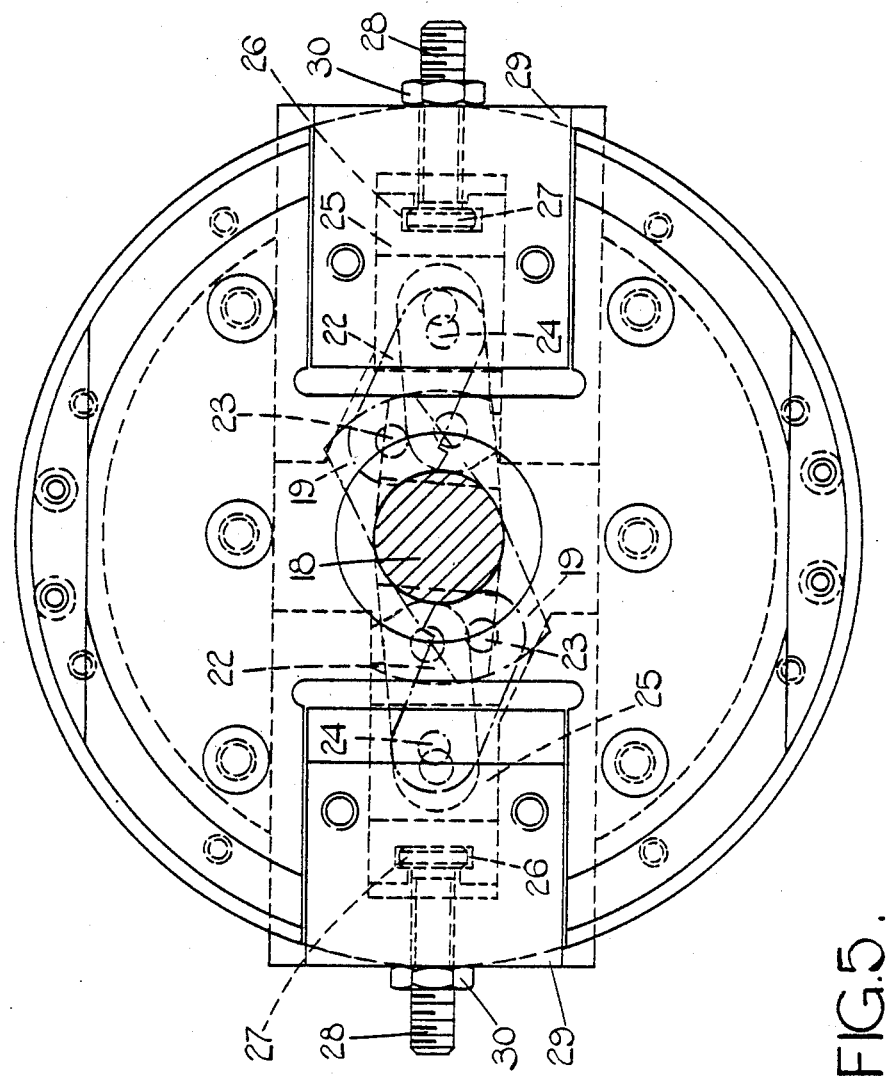
FIG. 5 is a cross-section along the line B—B of FIG. 2.

A plurality of radially acting clamping members 37, in this case six, are located at spaced intervals around the drum above the first clamp members 32, as will be seen more clearly from FIGS. 2 and 3. Each clamping 37 is coupled by means of a corresponding pin 38 to a clamp actuating member 39. The member 39 is keyed to the secondary operating shaft 18 at point 40 and is provided with a hexagonal formation 41 to which an appropriate wrench (spanner) may be applied to effect rotation of the shaft 18, for the purpose to be described.

The pins 38 are housed in slots 42 formed in the undersurface of the member 39, each slot having an arcuate surface 42a arranged so that rotation of the member 39 in one direction will cause the pins 38 to retract the clamping members radially inwardly by a distance such that these members, when retracted, are clear of radially innermost extremities of the areas occupied by the shoe webs 34. The outer end portion 43 of the operating shaft 18 is threaded to receive a clamping nut 44 thereon which acts on the clamp actuating member 39 through a thrust washer 45 to apply an axial clamping force via the latter and the clamping members 37 to the web 34 when disposed within the drum.

The pressure applying means indicated generally at 4, has a body 46 forming a cylinder to receive therein a piston 47 for slidable reciprocation, the piston being actuated to move outwardly of the cylinder, against the action of a return spring 48, by pneumatic or hydraulic fluid pressure applied to the interior of the cylinder in conventional manner. The outer end portion of the piston is bifurcated to receive a roller 49 rotatably mounted on a shaft 50, the roller having a relatively narrow radial flange 51 which extends into a peripheral slot 52 of the drum 12 to engage the platform 35 at a location thereon opposed to the position of the abutment of the platform with the web 34.

The apparatus described above has capacity for clamping two sets of brake shoe components simultaneously for the welding thereof as will be seen, for example, from FIG. 3. In order to place the components in position preparatory to a welding operation, the shaft 18 is rotated to a position in which the toggle links 22 are in their positions as shown in dash-dotted lines in FIG. 2, i.e. with the slides 29 in their radially innermost positions; rotation of the actuating member 29 with the shaft 18 will also have withdrawn the clamping members 37 to their radially innermost positions. It is now possible to place two sets of shoe components within the drum with the platforms 35 against the internal drum surfaces 36 and the resting on the clamp members 32. The shaft 18 is then turned in the reverse direction to bring the links 22 into their positions as shown on dotted lines in FIG. 4, thereby moving the slides 29, and consequently the clamping members 32 keyed thereto, radially outwardly, the shoulders 33 of the clamping members pushing on the shoe webs 34 and thereby urging the platforms 35 into engagement with the internal drum surface 36. Each platform/web assembly is thus clamped in the radial direction between the adjacent drum surface 36 and the step 33 on the clamping member 32. Rotation of the shaft 18 will also have moved the clamps 37 radially outwardly, by virtue of the pins 38 engaged within the slots 42 of the actuator 39, so that end portions of the clamps 37 overlie the webs 34. An axial clamping force can now be applied to the webs by tightening the nut 44, the clamping force being transmitted from the nut via the actuator 39 and clamps 37 onto the webs.

With the shoe component assemblies thus clamped accurately in position, the welding process can be commenced. Initially, the roller 49 is retracted from the platform 35 and the drum assembly is set in rotation relative to the focused laser beam L. Simultaneously with the commencement of rotation, or after a predetermined delay, the focusing laser device L is switched on by means (not shown) acting in timed relation with the drum to produce a laser beam 'l'. The beam is directed at the required power and intensity, e.g. 1 kw and around $10^6$ watts $cm^{-2}$, at the upwardly facing angle between the platform and web. This results in local melting of the material of the platform and web, creating a quantity of weld pool material and effecting a weld. Prior to the commencement of welding, the piston 47 is actuated, by introduction of fluid pressure medium into the cylinder 46, to urge the roller 49 against the platform 35, which it engages at a location directly opposite to the abutment of the web against the other side of the platform. This clamping together of the two welded components under relatively high pressure compensates for shrinkage which normally occurs in the weld pool material and which cannot be accommodated by the components because of their high mechanical restraint geometry. The cracking of the weld which would normally occur is therefore minimised, if not totally avoided, and an excellent beaded weld is produced at the junction between the components.

A cam ring 101 co-operates with a follower 102 which is caused to actuate a valve 103 at the appropriate time to cause the aforesaid operation of the roller and its subsequent retraction. Similar means are used to switch the laser beam on and off at the appropriate time. With the apparatus described above, the two sets of brake shoe components are welded successively during a 360° rotation of the drum, although it would be possible, by employing an appropriate number of laser projections, to weld a plurality of sets simultaneously during rotation of the drum through half of the arc of a circle. Some brake shoes are provided with a pair of webs spaced across the platform and this type of shoe could be accommodated by providing twin rollers 49 to engage appropriate locations on the platform opposite to the webs and by arranging a pair of focused laser beams to operate either simultaneously or alternately from above and below the drum. Such an arrangement can also be used with a single web assembly.

It is found that, because of the relatively localised heating produced by the laser beam and the clamping together of the platform 35 and web 34 during the period in which they are welded and cooled, the distortion produced in the welded components is minimal which, in the case of brake shoes, means that linings may be affixed to the shoe platforms without the customary planishing of the platform which has hitherto been necessary, and possibly without grinding the lining accurately to shape, thereby obviating risk arising from the presence of asbestos dust. The components of the welded article may be stamped out and welding effected without any corrective finishing of relatively rough edges and not additional material need be provided at the tips of brake shoe webs. Welded articles, and particularly brake shoes, can thus be produced more economically than hitherto.

It will be appreciated that, instead of preforming the platform of a brake shoe to its desired shape as described above, the method of the invention may be performed by forming a flat plate which is bent to allow the web contour during the welding operation. The flat plate may be continuously fed and cropped as necessary, or alternatively fed in pre-cut lengths.

By way of example, in one typical practical form of the invention, 3 mm thick webs have been welded to 2.5 mm thick platforms using a 5 kW carbon dioxide laser to form 200 mm diameter automotive brake shoes. By using a laser beam power of 4 kW at the workpiece, focused to produce an intensity of approximately $5 \times 10^6$ Watts cm$^{-2}$, and with an additional load of approximately 1 tonne (British) applied to the components, fully penetrating welds free from porosity and cracking were produced by a welding speed of 50 mm s$^{-1}$.

It will be understood that a welding beam may be constituted by electron, plasma arc or plasma jet energy.

We claim:

1. A method of welding together arcuate metal components of high restraint geometry having arcuate surfaces to be joined, comprising: supporting the components with said arcuate surfaces in juxtaposed relationship; applying a first force to the components to urge said surfaces firmly into abutting relationship; directing a high energy density beam at the junction formed between the abutting surfaces to effect welding at a localized region of mutual abutment thereof; and applying an additional force to the components adjacent to the area of impingement of the beam on the component at said localized region sufficient to urge them together at said localized region, in order to compensate for stresses set up therein during welding.

2. A method according to claim 1 and further comprising; moving the components, supported in abutting relationship, relative to the position at which the weld is effected, in order to produce a continuous elongate weld.

3. A method according to claim 2 wherein said additional force is applied as a localized force and the location of its action is varied progressively along the components as a function of said relative movement between said position and the abutting components.

4. A method according to claim 3 wherein the additional force is applied continuously at a location slightly behind said position relative to the progress of the weld formation along the components.

5. A method according to claim 4 applied to the formation of a butt weld between the platform and web of a brake shoe, comprising supporting the components in mutually perpendicular planes, with the convex edge of the web in abutment with the concave surface of the platform, effecting said weld at the junction between the abutting surfaces of the components, effecting relative rotation between the components and the position at which the weld is effected to produce a continuous weld, and applying the additional force to the components continuously to urge them together at a location adjacent to said position relative to the progress of the weld formation along the components.

6. A method according to claim 5 wherein the components are urged into abutting relationship in their initial supported positions by applying a clamping force to one component and reacting it via the other component against a relatively fixed surface.

7. A method according to claim 6 wherein the additional force urging the components together adjacent to said position is applied to said other component in a direction opposed to the clamping force.

8. A method according to claim 7 wherein the weld is effected by the application of a high energy density beam.

9. A method according to claim 8 wherein the weld is effected by the application of a high energy density beam directed generally transversely to the direction of said relative movement between the components and said position.

10. A method according to claim 9 wherein the beam is of laser energy.

11. A method according to claim 10 wherein one of the components is shaped into a high restraint geometry configuration as it is urged into abutting relationship with the other component.

12. A method according to claim 11 wherein said one component is formed by feeding a continuous length of stock and after said shaping has taken place cropping the stock the leave said one component of desired length in relation to the other component.

13. A method according to claim 11 wherein said one component is precut to a desired length prior to being shaped into a high restraint geometry configuration.

14. Apparatus for welding together arcuate metal components of high restraint geometry having arcuate surfaces to be joined comprising: support means arranged to support the components with said arcuate surfaces in juxtaposed relationship; means operatively, associated with said support means to apply a first force to said components to urge said surfaces firmly into abutting relationship, a welding device operatively associated with said support means to direct a high energy density beam at the junction between said surfaces to effect welding at a localized region of mutual abutment thereof, and means operatively associated with said support means to apply an additional force to the components adjacent to the area of impingement of the beam on the component at said localized region to urge them together at said region, in order to compensate for stresses set up therein during welding.

15. A method according to claim 9 wherein the beam is of electron energy.

16. Apparatus according to claim 14 wherein the support means and welding device are arranged for relative movement to permit the formation of at least one elongate continuous weld along a length of the components.

17. Apparatus according to claim 16 wherein said additional force-applying means comprises a rolling member engageable with a surface of one of the components and arranged to roll over that surface during said relative movement.

18. Apparatus according to claim 17 wherein power means is arranged to cooperate with the additional force-applying means to apply said additional force to the components.

19. Apparatus according to claim 18 and further comprising spring means urging the roller away from said surface and against which said power means operates.

20. Apparatus acccording to claim 19 wherein clamp means is provided to clamp the components in their supported positions.

21. Apparatus according to claim 20, wherein said clamp means comprises a movable clamping member operable to apply said first force to one component and, a relatively fixed surface against which the other component is urged by said first force.

22. Apparatus according to claim 21 wherein said additional forceapplying means is arranged to act in a direction opposed to the clamping force.

23. Apparatus according to claim 22 wherein the support means comprises a rotatable hollow drum and the components are urged by said clamping member towards the internal surface of the drum against which one of them abuts, and further comprising, a peripheral groove in said drum through which said additional force applying means projects into contact with the component abutting against said surface.

24. Apparatus according to claim 23 wherein said clamp means further comprises a clamping member, an actuating shaft, and toggle links operatively connecting said clamping member to said shaft so that rotation of the shaft in one direction urges the clamping member via the links outwardly towards said drum surface.

25. Apparatus according to claim 24 wherein said clamp means further comprises at least one further clamping has been operable to clamp the other component against a further surface extending in a plane at right angles to said fixed surface.

26. Apparatus according to claim 25 wherein each further clamping member is operatively connected to said shaft so that rotation of the shaft in one direction simultaneously moves said clamping member and each further clamping member outwardly towards said drum surface and their clamping positions.

27. Apparatus for welding together components of high restraint geometry in the form of a platform and web of a vehicle brake shoe, comprising a hollow drum arranged to support a pair of shoe platforms against opposed portions of the internal surface of said drum, clamping means including clamping members operable to apply a clamping force to webs abutting the respective platforms at right angles and thereby clamp the components against said surface, said clamping means including further clamping members operable to clamp the webs against a support surface at right angles to said drum surface, a welding device arranged and operable to direct a beam of welding energy at a location of abutment between the components to effect welding, a slot through the periphery of said drum, and fluid pressure operated force applying means including a roller which projects through said slot in the drum to engage the drum engaging surface of the platform at a location opposed to the abutment location of the web with the platform, the force applying means applying an additional force to the components at least adjacent to the location of impingement of the beam in order to compensate for stresses set up therein during welding.

28. A method according to claim 9 wherein the beam is of plasma energy.

29. An article formed by welding together metal components of high restraint geometry using the method of claim 1 or 13.

30. An article according to claim 29 in the form of a brake shoe of which a platform and web are butt welded together.

31. Apparatus according to claim 14 or 27 wherein the welding device is a laser.

32. Apparatus according to claim 14 or 27 wherein the welding device is a plasma arc.

33. Apparatus according to claim 14 or 27 wherein the welding device is a plasma jet.

* * * * *